(12) United States Patent
Espinose et al.

(10) Patent No.: US 6,910,316 B2
(45) Date of Patent: Jun. 28, 2005

(54) VEHICLE SHIELD DEVICE AND METHODS FOR MANUFACTURING AND SHIPPING A VEHICLE SHIELD DEVICE

(75) Inventors: Nathan Peter Espinose, Plymouth, MN (US); Roger Kent Gibson, Longmont, CO (US)

(73) Assignee: Lund International, Inc., Anoka, IL (US)

( * ) Notice: Subject to any disclaimer, the term of this patent is extended or adjusted under 35 U.S.C. 154(b) by 0 days.

(21) Appl. No.: 10/822,911

(22) Filed: Apr. 12, 2004

(65) Prior Publication Data

US 2004/0189037 A1 Sep. 30, 2004

Related U.S. Application Data

(62) Division of application No. 10/393,956, filed on Mar. 20, 2003, now Pat. No. 6,752,446, which is a division of application No. 09/925,611, filed on Aug. 9, 2001, now Pat. No. 6,547,306.
(60) Provisional application No. 60/224,569, filed on Aug. 10, 2000.

(51) Int. Cl.[7] .............................................. B65B 63/04
(52) U.S. Cl. .......................................... 53/429; 296/91
(58) Field of Search .......................... 296/90, 91, 1.07, 296/901.1; 53/428, 429, 116; 206/218, 499, 546, 577, 760

(56) References Cited

U.S. PATENT DOCUMENTS

| | | | |
|---|---|---|---|
| 2,034,493 A | 3/1936 | Sonnenberg | |
| 2,793,705 A | 5/1957 | Garrity | |
| 3,015,517 A | 1/1962 | Thornburgh | |
| 3,022,848 A | 2/1962 | Heiser | |
| 3,815,700 A | * 6/1974 | Mittendorf | 296/91 |
| 3,831,696 A | * 8/1974 | Mittendorf et al. | 296/91 |
| 3,835,992 A | * 9/1974 | Adams, IV | 206/499 |
| 4,052,099 A | 10/1977 | Lowery et al. | |
| 4,153,129 A | 5/1979 | Redmond | |
| 4,219,218 A | 8/1980 | Waldon | |
| 4,262,954 A | 4/1981 | Thompson | |
| 4,376,546 A | 3/1983 | Guccione et al. | |
| 4,471,991 A | * 9/1984 | Matthias | 296/91 |
| D284,847 S | 7/1986 | Smith | |
| 4,621,860 A | 11/1986 | Gerst | |
| 4,627,657 A | * 12/1986 | Daniels et al. | 296/91 |
| D300,918 S | 5/1989 | Turner | |
| 4,842,319 A | 6/1989 | Ziegler | |
| 4,846,522 A | * 7/1989 | Bonstead et al. | 296/91 |
| 4,883,139 A | 11/1989 | Gross | |
| 4,952,006 A | 8/1990 | Willey | |
| 4,953,909 A | 9/1990 | Crane | |
| 5,039,156 A | * 8/1991 | Messmore et al. | 296/91 |
| 5,094,497 A | * 3/1992 | Hartung et al. | 296/91 |
| 5,226,530 A | * 7/1993 | Golden | 53/428 |
| 5,348,363 A | * 9/1994 | Fink | 296/91 |
| 5,755,483 A | 5/1998 | Lund | |
| 5,867,825 A | * 2/1999 | Scheerer | 53/429 |
| 6,547,306 B2 | 4/2003 | Espinose et al. | |

FOREIGN PATENT DOCUMENTS

GB          1375886          11/1974

* cited by examiner

Primary Examiner—Louis Huynh
(74) Attorney, Agent, or Firm—Merchant & Gould P.C.

(57) ABSTRACT

A vehicle shield device includes a hood protector region and hood attachment region. The hood protector region is constructed for extending across at least a portion of a vehicle hood for protecting the vehicle hood. The hood protector region includes at least one flexible region for allowing folding of the hood protector region to provide the vehicle shield device in a folded configuration that is shorter than the full length of the vehicle shield device as it would be provided when mounted to a vehicle hood so that the vehicle shield device can be packaged and shipped in the folded configuration. The hood protector region and the hood attachment region can be provided from a molded and continuous plastic sheet.

8 Claims, 14 Drawing Sheets

VEHICLE SHIELD DEVICE AND METHODS FOR MANUFACTURING AND SHIPPING A VEHICLE SHIELD DEVICE

This application is a divisional application of U.S. application Ser. No. 10/393,956, filed on Mar. 20, 2003, now U.S. Pat. No. 6,752,446, which is a divisional application of U.S. application Ser. No. 09/925,611, filed on Aug. 9, 2001, now U.S. Pat. No. 6,547,306, which claims priority to U.S. Provisional Application Ser. No. 60/224,569, filed on Aug. 10, 2000. U.S. application Ser. No. 10/393,956, U.S. application Ser. No. 09/925,611, and U.S. Provisional Application Ser. No. 60/224,569 are incorporated herein by reference.

FIELD OF THE INVENTION

The invention relates to a vehicle shield for mounting to the hood of a vehicle, and to methods for manufacturing and shipping a vehicle shield for mounting to the hood of a vehicle.

BACKGROUND OF THE INVENTION

Numerous vehicle shield devices have been placed on the fronts of vehicles in an attempt to protect the fronts of the vehicles from contact with road debris and to deflect airflow away from the windshields. These devices are often referred to as bug shields or airflow deflectors. Airflow deflectors are described by U.S. Pat. No. 5,755,483 to Lund assigned to Lund Industries, Incorporated, the assignee of the above-identified patent application. Additional United States patents disclosing airflow deflectors include U.S. Pat. No. 3,815,700 to Mittendorf; U.S. Pat. No. 3,015,517 to Thornburgh; U.S. Pat. No. 4,153,129 to Redmond; and U.S. Pat. No. 4,052,099 to Lowery et al.

Vehicle shield devices are generally long enough to span the width of a vehicle hood. Wrap around vehicle shield devices generally extend beyond the edge of the hood and extend rearwardly. Because of the length of vehicle shield devices, they can be expensive to ship.

SUMMARY OF THE INVENTION

A vehicle shield device is provided according to the invention. The vehicle shield device includes a hood protector region and hood attachment region. The hood protector region is constructed for extending across at least a portion of a vehicle hood for protecting the vehicle hood. The hood protector region includes at least one flexible region for allowing folding of the hood protector region. The hood attachment region is constructed for attaching the hood protector region to a vehicle hood. The hood attachment region includes a first hood attachment flange attached to at least a portion of the hood protector region and constructed for attaching to a left side of a vehicle hood, and a second hood attachment flange attached to at least a portion of the hood protector region and constructed for attachment to a right side of a vehicle hood. The hood attachment flanges are preferably provided for attaching to the underside of the vehicle hood using a fastener.

The hood protector region and the hood attachment region can be provided from a molded and continuous plastic sheet. The plastic sheet can comprise a polymer composition that allows the vehicle shield device to be folded one or more times so that the vehicle shield device can be shipped in a container that is shorter than the full length of the vehicle shield device as it would be provided when mounted to a vehicle hood. Preferably, the plastic sheet is prepared from a polymer composition that is sufficiently flexible so that the area or areas of fold do not include any appreciable cracking or crazing. Exemplary polymer compositions for providing the plastic sheet can be polycarbonate polymer containing compositions. It is expected that other polymer compositions and blends of polymers can be used to provide the desired degree of flexibility while resisting cracking and crazing. It is expected that the vehicle shield device can be folded once, or folded numerous times in order to decrease the angle of fold or bend and thereby reduce the amount of stress provided on the shield device at the area of fold and thereby further reduce the occurrence of cracking and/or crazing. For example, the shield device can be folded twice, three times, four times, etc.

It should be understood that the terms cracking and crazing, as used herein, refers to the existence of a commercially unacceptable level of cracking and/or crazing. There may be an amount of cracking and/or crazing that is commercially acceptable because it does not disfigure the shield device from the perspective of an ordinary consumer. In addition, the existence of a certain level of cracking and/or crazing may be permissible if the useful life of the shield device is not so adversely effected that it decreases the commercial value or acceptability of the shield device. Accordingly, the reference in this application to a lack of appreciable cracking or crazing refers to a level of cracking or crazing that renders the shield device commercially unacceptable.

A method for manufacturing a vehicle shield is provided by the invention. The method includes a step of cutting a sheet of plastic material to provide a work piece having the desired form, and molding the work piece to provide the vehicle shield device. An exemplary technique of molding includes drape molding.

A method for shipping a vehicle shield is provided according to the invention. The method includes steps of bending at least a portion of the vehicle shield device to provide a folded vehicle shield device, and then placing the folded vehicle shield device in a container for shipment. The bend or bends provided in the vehicle shield device can be any degree sufficient to reduce the overall length of the vehicle shield device. For example, a single bend or fold can be significantly less than 180° and even less than 90°. Furthermore, the vehicle shield device can be folded once, twice, three times, four times, etc. in order to provide the resulting folded vehicle shield with the desired configuration for shipment. The summation of the interior fold angles provided by a vehicle shield device according to the invention provided in a folded configuration can be between about 120° and 360°, and can be between 130° and 180°. When provided in a folded configuration, the vehicle shield can be shipped in a shorter container than would otherwise be required for the vehicle shield not being in a folded configuration.

DETAILED DESCRIPTION OF THE PREFERRED EMBODIMENT

Figure 1:
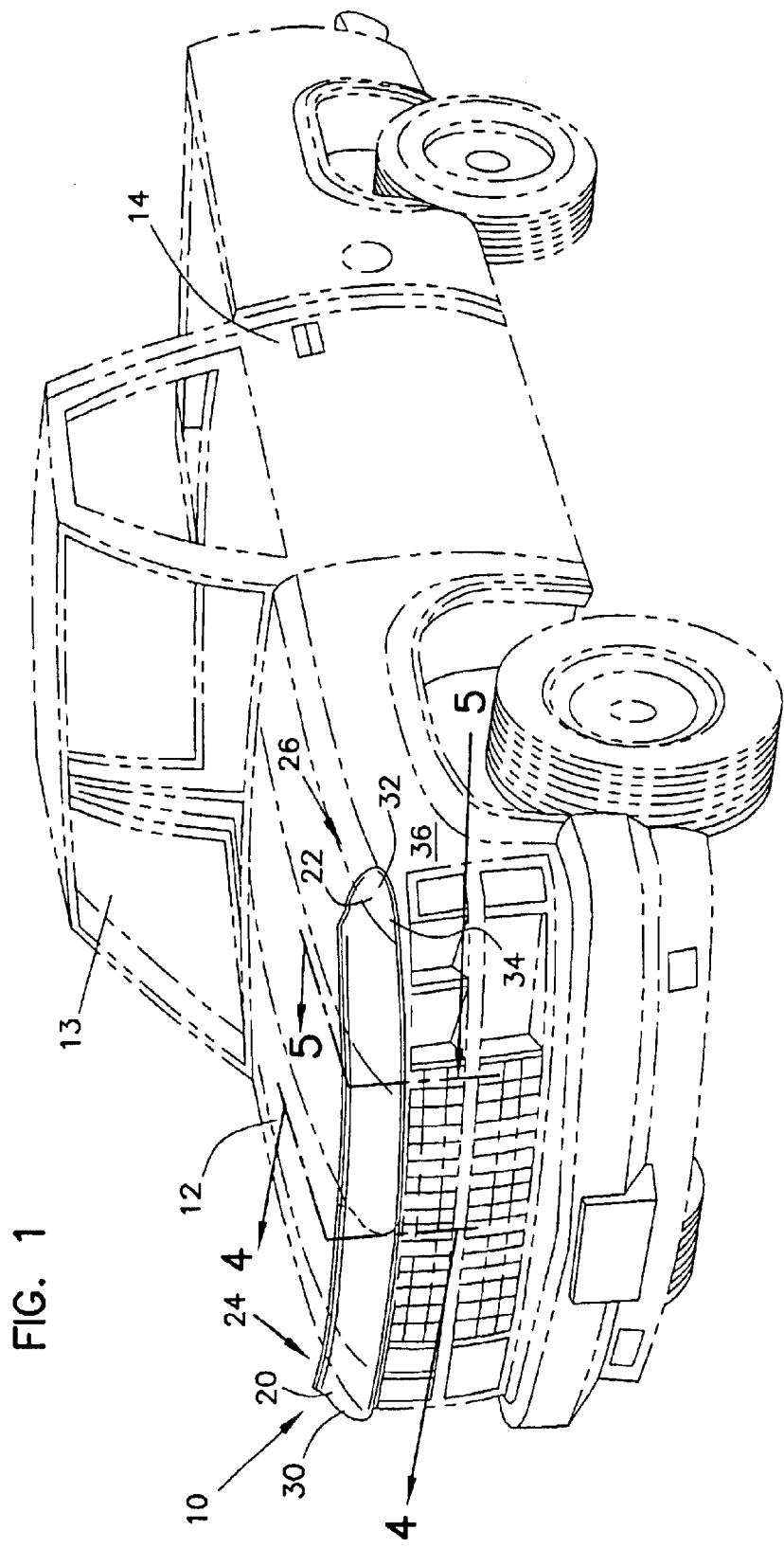
FIG. 1 is a perspective view of a vehicle shield device according to the principles of the invention provided on a motor vehicle.

Now referring to FIGS. 1–5, a vehicle shield device according to the invention is shown at reference numeral 10. The vehicle shield device 10 can be referred to as an airflow deflector or more simply as a vehicle shield. The vehicle shield 10 is shown attached to the hood 12 of a motor vehicle 14, and is generally provided for protecting the hood 12 and windshield 13 of the motor vehicle. Vehicle shields are particularly popular on pickup trucks and sports utility vehicles.

The vehicle shield 10 can be referred to as a wrap around shield because of the presence of the end wrapping portions 20 and 22. In general, the end wrapping portions 20 and 22 are provided on the outer ends 24 and 26 of the vehicle shield and curve toward the rear of the vehicle. The end wrapping portions 20 and 22 can be referred to as fender protector portions 30 and 32 when they are provided wrapping around the leading edge 34 of a fender 36. A wrap around vehicle shield is disclosed by U.S. Pat. No. 5,755,483 to Lund, the entire disclosure being incorporated herein by reference.

Figure 3:
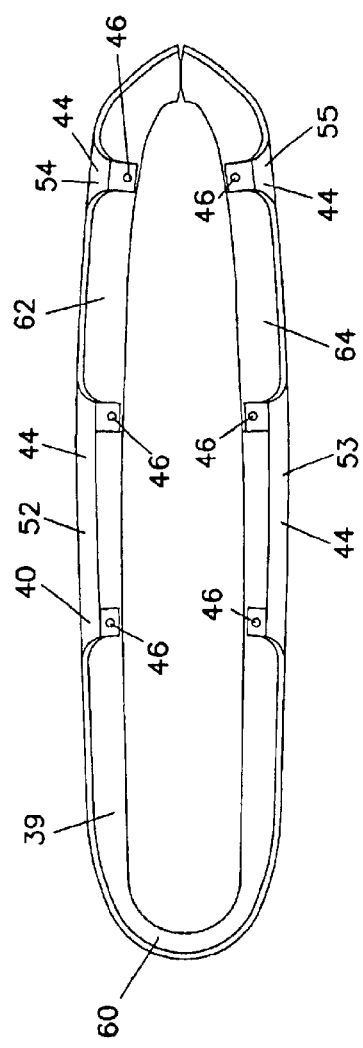
FIG. 3 is a bottom view of the vehicle shield device shown in FIG. 1 provided in a folded configuration.
Figure 4:
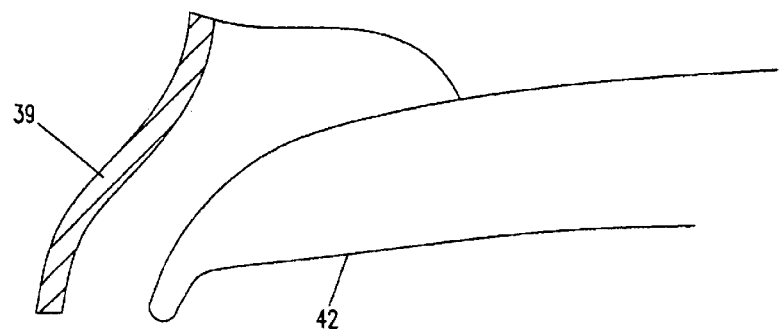
FIG. 4 is a cross-sectional side view of the vehicle shield device shown in FIG. 1 with a portion of the vehicle shown.
Figure 5:
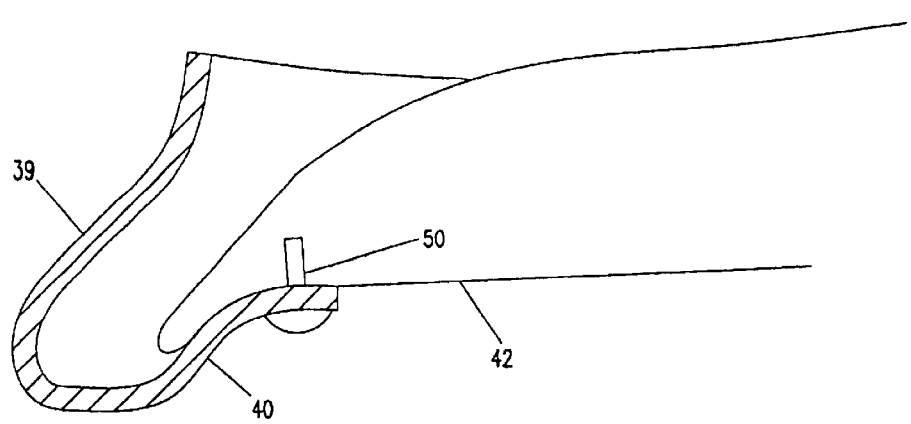
FIG. 5 is a cross-sectional side view of the vehicle shield device shown in FIG. 1 with a portion of the vehicle shown.

The vehicle shield 10 includes a hood protector region 39 and hood attachment region 40. The hood protector region 39 is generally provided for protecting the hood 12 and the windshield 13. When the hood protector region 39 includes the end wrapping portions 20 and 22, the hood protector region 39 additionally protects the fender 36. The hood attachment region 40 is provided for attaching the vehicle shield 10 to the hood 12. Preferably, the hood attachment region 40 provides for attachment to the underside 42 of the hood 12. The hood attachment region 40 preferably includes at least two attachment flanges 44 for attachment to the hood underside 42. As shown in FIG. 3, the vehicle shield 10 includes four attachment flanges 44. The attachment flanges 44 are provided attached to the hood protector region 39. Preferably, the attachment flanges 44 and the hood protector region 40 are provided from a single, continuous sheet. The sheet preferably includes a polymeric or plastic material that is cut and then molded to provide the vehicle shield 10.

The attachment flanges 44 preferably include mounting spaces 46 for attaching the attachment flanges 44 to the hood 12: Fasteners 50 can be provided extending through the mounting spaces 36 for attaching the shield device 10 to the hood underside 42. Preferred fasteners that can be used include screws, bolts, threaded plugs, etc.

The hood attachment region 40 includes a first attachment flange 52, a second attachment flange 53, a third attachment flange 54 and a fourth attachment flange 55.

Figure 2:
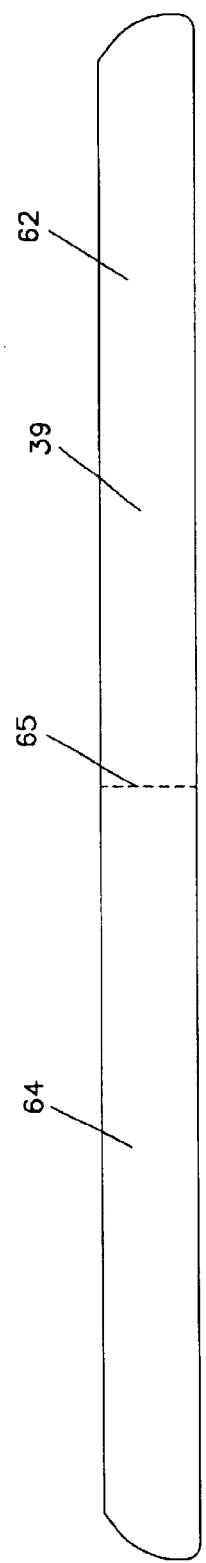
FIG. 2 is a front view of the vehicle shield device shown in FIG. 1.

The vehicle shield 10 includes at least one flexible region 60 for allowing folding of the hood protector region 39. As shown in FIG. 3, the left side 62 and the right side 64 of the vehicle shield can be folded so that the vehicle shield can be shipped in a smaller container. Preferably, the left side 62 and the right side 64 of the vehicle shield 10 can be banded together to hold the vehicle shield 10 in a folded configuration for shipment. The sides of the vehicle shield 10 can be held together by tape, adhesive tape, string, rubber band, or any other fastener capable of holding the sides together and that can be removed without damaging the vehicle shield. In FIG. 2, the line 65 refers to the center line of the hood protector region 39 and not to a fold line.

The flexible region 60 can be characterized as having an absence of the attachment flange in that region that would interfere with bending or folding. That is, by providing the absence of the attachment flange in the flexible region 60, the hood protector region 39 can bend without interference from the hood attachment region because of its absence in the flexible region 60.

Figure 6:
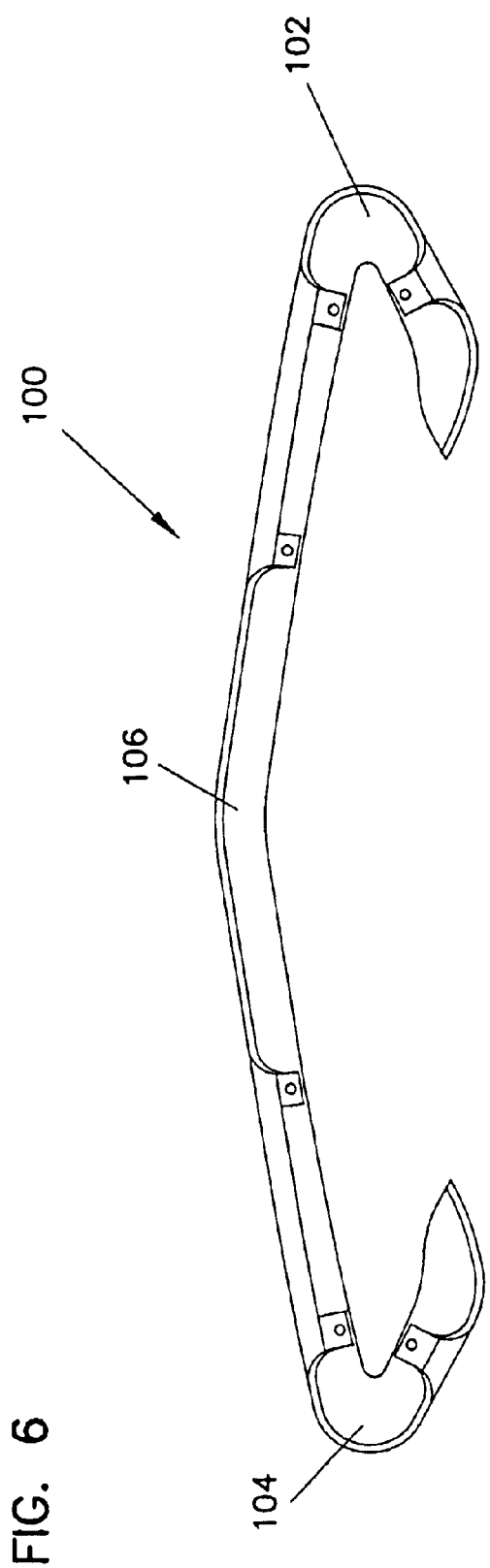
FIG. 6 is a bottom view of an alternative vehicle shield device according to the principles of the invention provided in a folded configuration.
Figure 7:
FIGS. 7–24 are photographs of various views of three vehicle shield devices according to the principles of the present invention.
Figure 8:
Figure 9:
Figure 10:
Figure 11:
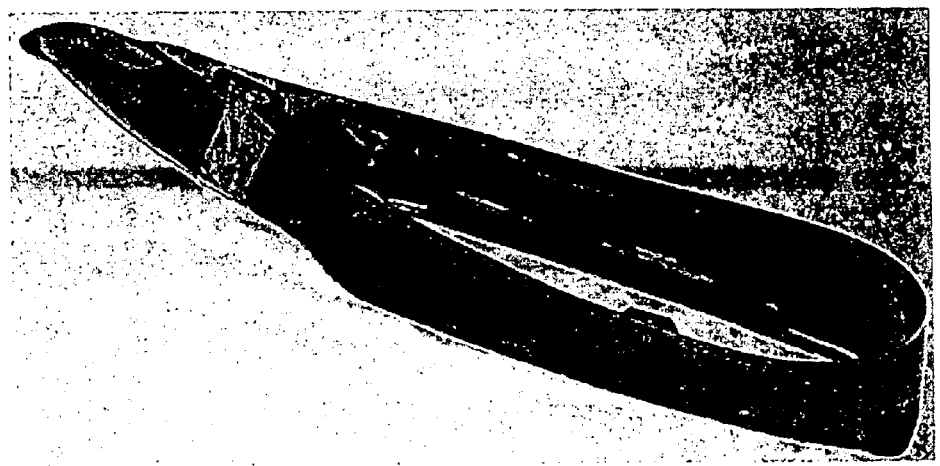
Figure 12:
Figure 13:
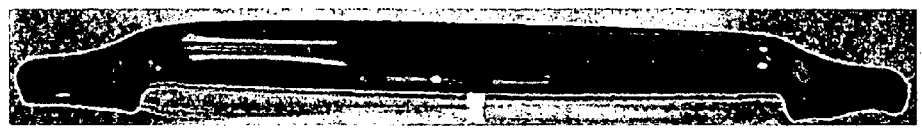
Figure 14:
Figure 15:
Figure 16:
Figure 17:
Figure 18:
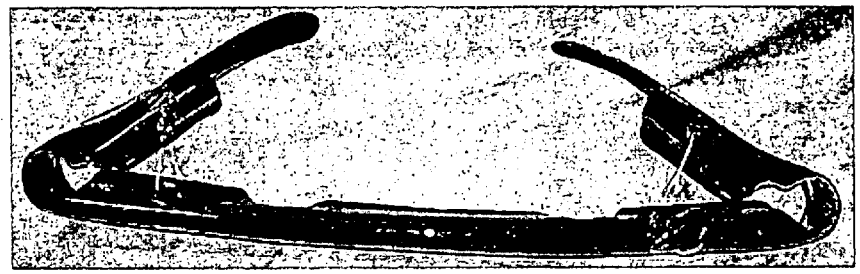
Figure 19:
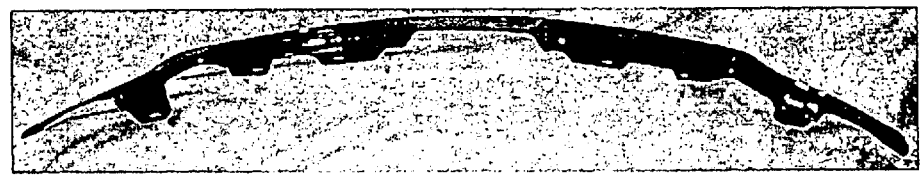
Figure 20:
Figure 21:
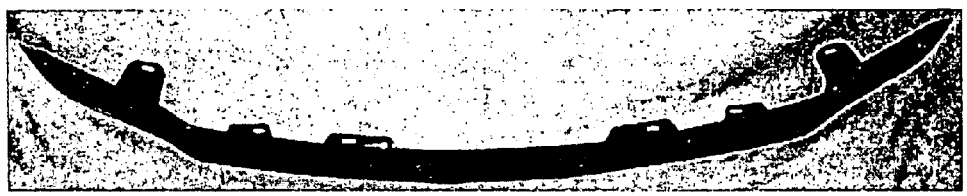
Figure 22:
Figure 23:
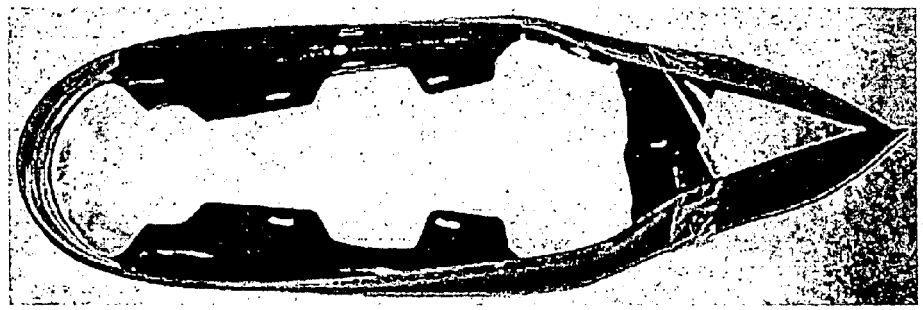
Figure 24:
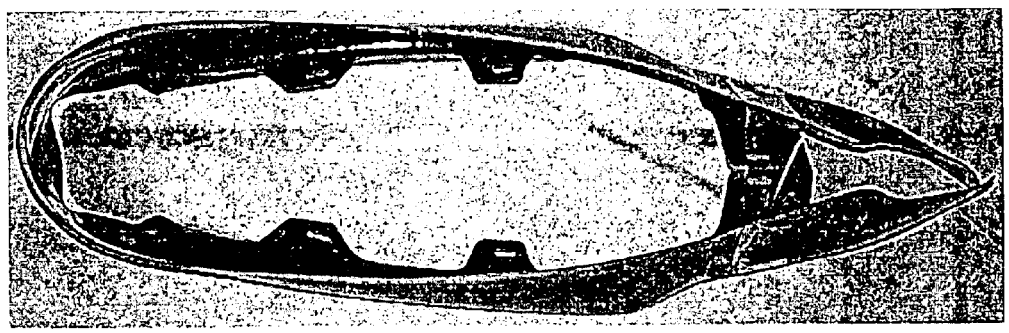

Now referring to FIG. 6, an alternative vehicle shield device according to the invention is indicated at reference numeral 100. The vehicle shield 100 includes two flexible regions 102 and 104. The vehicle shield 100 can bend in the flexible regions 102 and 104 to provide a more compact shield for shipment. In addition, the vehicle shield can be provided with another flexible region 106 for additional folding. Furthermore, the bends can be less severe to achieve a vehicle shield device that can be shipped in a smaller container. That is, by providing more than one bend in the vehicle shield device, the stress at each bend can be lessened to reduce incidents of cracking or crazing. In alternative embodiments, the vehicle shield device can be bent or folded once, twice, three times, four times, etc. In order to obtain a vehicle shield that can be shipped in a smaller container than the vehicle shield device would otherwise have to be shipped in without any folds or bends. By providing the vehicle shield device in a smaller container, it is believed that significant savings in shipping costs will be achieved. When the vehicle shield device is provided in a folded configuration, the summation of interior angles at each fold can total between 120° and 360°, and can total between 130° and 180°.

The shield device is preferably manufactured from a sheet comprising a polymer composition. The polymer composition that can be used according to the invention preferably includes a polymer that provides the desired degree of bending so that the shield can be shipped in a smaller container, and that will straighten without providing an undesirable crease or wrinkle in the shield at the area it was bent. The vehicle shield 10 is preferably manufactured from a continuous sheet of plastic. A preferred plastic material is one that has sufficient flexibility to avoid cracking or crazing in the area of bend while still providing a vehicle shield device that functions well under conditions of use. An exemplary plastic material that can be used includes polycarbonate polymer and mixtures of polycarbonate polymer with other polymers. Polymeric materials that can be used to manufacture the vehicle shield include polycarbonates and are available under the name Lexan from G. E. Plastics.

The vehicle shield according to the invention can be prepared by dye cutting a blank sheet of plastic material, and then draped forming the dye cut plastic material on a mold. The plastic sheet preferably has a thickness that provides the vehicle shield with sufficient rigidity to withstand the wind pressures caused by being placed on the hood of a motor vehicle and will resist fluttering. The plastic sheet can have a thickness of between about 0.070 inch to about 0.150 inch, and the thickness can be between about 0.080 inch and about 0.10 inch.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for packaging a vehicle shield device, the method comprising steps of:
   providing a vehicle shield device comprising:
      hood protector region constructed for extending across at least a portion of a vehicle hood for protecting the vehicle hood, the hood protector region comprising at least one flexible region for allowing bending of the hood protector region; and
      hood attachment region constructed for attaching the hood protector region to a vehicle hood;
   bending the hood protector region about the flexible region to provide the vehicle shield device in a folded configuration that is shorter than the full length of the vehicle shield device as it would be provided when mounted to a vehicle hood;
   providing a shipping container; and
   placing the vehicle shield device in the folded configuration into the shipping container.

2. A method according to claim 1, further comprising a step of using a fastener to hold the vehicle shield device in the folded configuration.

3. A method according to claim 2, wherein the fastener comprises adhesive tape.

4. A method according to claim 1, wherein the hood protector region and the hood attachment region comprise a molded and continuous plastic sheet.

5. A method according to claim 4, wherein the plastic sheet comprises a polycarbonate polymer composition.

6. A method according to claim 4, wherein the plastic sheet has a thickness of between about 0.070 inch and about 0.150 inch.

7. A method according to claim 1, wherein the vehicle shield does not include a hood attachment flange within the flexible region.

8. A method according to claim 1, wherein the hood attachment region comprises:
   (i) first hood attachment flange attached to at least a portion of the hood protector region and constructed for attaching to the left side of the vehicle hood;
   (ii) second hood attachment flange attached to at least a portion of the hood protector region and constructed for attachment to a right side of a vehicle hood.

* * * * *